United States Patent Office 3,170,760
Patented Feb. 23, 1965

---

3,170,760
PROCESS FOR RECOVERING COBALT BASE CATALYSTS
Giuseppe Morbidelli, Como, Italy, Luigi Notarbartolo, deceased, late of Milan, Italy, by Enza Pascalino and Paola Notarbartolo, administratrix and heiress, assignors to Snia Viscosa Società Nazionale Industria Applicazioni Viscosa S.p.A., Milan, Italy, a company of Italy
No Drawing. Filed Nov. 6, 1962, Ser. No. 236,187
Claims priority, application Italy, Nov. 9, 1961, 661,531
9 Claims. (Cl. 23—87)

This invention relates to a process for recovering cobalt base catalysts particularly in the production of benzoic acid by oxidation of toluene.

In copending patent applications of Muench et al. and Messina et al., respectively, Serial Nos. 207,822 and 209,272, respectively, filed July 5, 1962, and July 11, 1962, respectively, now abandoned, the oxidation of toluene with organic cobalt salts as catalysts has been described. In another copending application No. 229,234 the working up of the oxidation product to isolate therefrom benzoic acid has been described. In any case in carrying out the aforesaid processes mother waters are obtained from which the benzoic acid has been nearly wholly separated but which still contain small amounts of free benzoic acid and further contain the cobalt of the catalyst as cobalt benzoate. It is an object of this invention to recover the cobalt contained in said mother waters in a form and in such way as to allow it to be used again as catalyst.

The process according to this invention further permits the recovery of benzoic acid contained in said mother waters both as free acid and as cobalt bound acid.

The invention is based on the treatment of the mother waters with an ion exchange resin and more precisely with a cationic resin, sulphuric or carboxylic, operating in cycle $H^+$. Imac C12, Dusarit S and Castel C300 can be particularly suggested as suitable resins.

According to the invention, the mother waters are treated with the aforementioned cationic resin, which fixes the cobalt, at temperatures substantially comprised between 10 and 90° C. and preferably in the range 70–80° C.; subsequently the resin is regenerated and the cobalt is recovered as salt by a fractionated elution with a solution of hydrochloric or sulphuric acid or of any acids stronger than the resin.

The aqueous effluent resulting from the treatment with the resin contains all the benzoic acid (both free and combined) of the mother waters as free acid, which latter can be recovered in various ways, for instance by recycling the said waters in the process of separation of benzoic acid from the raw toluene oxidation product. The fractionated elution of the resin furnishes solutions of cobalt salts at relatively high concentrations (5–10%) from which any particular cobalt salt used as catalyst in the oxidation of toluene may be regenerated, for instance by treatment with an alkaline salt of the same organic acid.

Preferably, the starting mother waters before being treated with the resin, are treated with activated charcoal or decolorizing earths at the boiling point of the waters and filtered to eliminate impurities which would pollute the resin.

The fractionated elution according to this invention is carried out as follows. The exhausted resin is treated with a solution of a strong acid, preferably hydrochloric acid, at a concentration between 1% and 36% and in amounts comprised between 500 meq. and 3500 meq. per liter of resin. The term "meq." stands for "milli-equivalent," that is, one thousandth of the equivalent weight.

In practice the solution may contain and does contain, if the operation is carried out in the preferred way, small amounts of cobalt. After elution, the solution is fractionated in a convenient number of fractions which comprise:

(a) At least one head fraction and one tail fraction which do not contain cobalt and are eliminated;

(b) One or more intermediate fractions following the head fraction or fractions and one or more fractions immediately preceding the tail fraction or fractions, which contain cobalt chloride and free hydrochloric acid but at a low concentration, and which are utilized after the addition of concentrated hydrochloric acid, to form the eluent solution of a successive treatment;

(c) One or more central fractions containing together the major portion of the cobalt at a sufficiently high concentration and with a certain amount of free hydrochloric acid, which fractions constitute the product and are thereafter preferably employed to prepare to organic cobalt salt used as a catalyst.

The line of demarcation between fractions (b) and (c) is determined by the cobalt chloride concentration which is desired in the product.

The invention will be better understood from the description of the following nonlimitative embodiments.

The starting products are mother waters having a content of 0.785 gr./lt. of cobalt (present as 4.06 gr./lt. of cobalt benzoate) and 3 gr./lt. of free benzoic acid. Said mother waters, which are turbid yellow liquids, are first heated to boiling with 8 per thousand by weight of activated charcoal and are filtered. The filtrate obtained has a bright pink color.

The filtrate is passed in a column containing 150 gr. of resin Imac C12, said column having, in the embodiment described, an inner diameter of 28 mm. and the resin layer having a depth of 270 mm. The low rate of the waters is about 2.1 m./h. but can be increased up to 11 m./h. The temperature is maintained between 70 and 80° C.

The moment at which the resin becomes exhausted is determined by checking the pH of the effluent waters; the resin is considered to be exhausted when the outflow pH has risen so much as to reach approximately the value of the inflow pH. In the case of the waters used in this embodiment, the inflow pH is 3.9 and the outflow pH considered to mark the exhaustion of the resin is 3.8. The exhaustion of the resin could also be determined by controlling the cobalt content in the outflow waters.

Once the resin has been exhausted, the passage of the mother waters is discontinued and the resin is washed, always at a temperature of 70–80° C., with 500 cc. of distilled water which is united to the foregoing effluent waters, all the benzoic acid being thus separated as free benzoic acid, which can then be recovered in any convenient manner.

Subsequently, about 80 cc. of an aqueous hydrochloric solution containing about 10% hydrochloric acid and traces of cobalt are passed on the resin. Then the resin is washed with 400 cc. of distilled water.

The eluted waters are separated in six fractions as follows:

First fraction—90 cc., does not contain cobalt or hydrochloric acid.
Second fraction—10 cc., contains traces of cobalt and hydrochloric acid.
Third fraction—100 cc., contains 9.46 gr. of $CoCl_2$ and 0.876 gr. of free hydrochloric acid.
Fourth fraction—50 cc., contains 0.57 gr. of $CoCl_2$ and 0.22 gr. of free hydrochloric acid.
Fifth fraction—50 cc., contains traces of cobalt and hydrochloric acid.
Sixth fraction—180 cc., contains traces of hydrochloric acid but no cobalt.

By uniting the third and fourth fractions there are obtained 150 cc. of eluted solution containing 10.03 gr. of $CoCl_2$, equal to 6.68% and 1.1 gr. of free hydrochloric acid, equal to 0.73%.

Since the theoretrical amount of $CoCl_2$ is 11.08 gr., the yield of cobalt is 90.5%.

Fractions 2 and 5 are united and 20 cc. of concentrated hydrochloric acid are added thereto to make up the eluent solution of a following treatment. The first and sixth fractions on the contrary can be eliminated since they do not contain cobalt and only contain traces of hydrochloric acid.

An embodiment of invention has been described by way of example, but the same can be carried out by a person skilled in the art with numerous modifications, variations and adaptations without exceeding the scope of the invention and of the appended claims.

We claim:
1. A process for recovering cobalt base catalysts from a mother water having a low concentration of cobalt benzoate, comprising the steps of:
   (a) treating the mother water with a cationic resin at a temperature between 70 and 90° C. whereby the cobalt ions are absorbed by the resin,
   (b) eluting the resin having the adsorbed cobalt ions with an aqueous solution of hydrochloric acid,
   (c) fractionating the eluted solution into a plurality of fractions including (1) fractions essentially free from cobalt chloride, (2) fractions having a cobalt chloride content lower than 5 percent, and (3) at least a fraction having a cobalt chloride content higher than 5 percent,
   (d) recovering cobalt from the fraction having a cobalt chloride content higher than 5 percent, and
   (e) adding hydrochloric acid to the fractions having a cobalt chloride content lower than 5 percent, to form an aqueous solution of hydrochloric acid, adapted for regenerating the resin in a regenerating step as defined at (b), and further including cobalt chloride, and
   (f) subjecting the cobalt containing solution indicated at (d) to further steps leading to the recovery of the cobalt.

2. The process of claim 1, wherein the said mother water is treated with an absorbent substance selected from the group consisting of activated charcoal and decolorizing earths, at its boiling temperature and is then filtered, prior to its treatment with said cationic resin.

3. The process of claim 1, wherein the said aqueous solution made use of to regenerate the resin at step (b) has a concentration comprised between 1 and 36 percent of hydrochloric acid in water.

4. The process of claim 1, wherein the said resin regenerating step at (b) is performed by eluting the resin by adding said hydrochloric solution at an amount comprised between 500 and 3500 milli-equivalent per liter of cationic resin.

5. The process of claim 1, wherein the pH value of mother water as treated in step (a) is controlled, and the process is discontinued when the said pH value of the mother water treated according to step (a) has risen to essentially the pH value of the mother water to be treated in that step.

6. The process of claim 5, wherein the resin is washed with distilled water after discontinuance of treatment of the mother water.

7. The process of claim 1, wherein the said cationic resin is washed with distilled water upon the elution thereof with the said hydrochloric acid solution in the regenerating step at (b).

8. The process of claim 1, wherein the free benzoic acid which is formed in step (a) upon the reaction of cobalt benzoate and cationic resin, and which is in part carried on with the effluent treated water, is recovered from said effluent water.

9. The process of claim 5, wherein the free benzoic acid, which is formed in step at (a) upon the reaction of cobalt benzoate and cationic resin, and which is in part present in said resin upon the treatment, is recovered from said resin.

References Cited by the Examiner

UNITED STATES PATENTS

| | | | |
|---|---|---|---|
| 2,184,943 | 12/39 | Pattock et al. | 23—50 |
| 2,221,168 | 11/40 | Smit. | |
| 2,340,111 | 1/44 | D'Alelio. | |
| 2,366,651 | 1/45 | Rawlings | 23—50 |
| 2,409,861 | 10/46 | Hunter et al. | 23—50 |

OTHER REFERENCES

"Solubilities of Inorganic and Organic Compounds," by A. Seidell, volume 2, Supp. (1928), page 1178, D. Van Nostrand Co., Inc., N.Y.

"Ion Exchange Resins" by R. Kunin, pages 201, 204, J. Wiley and Sons, New York, 1958 edition.

MAURICE A. BRINDISI, *Primary Examiner.*